(12) United States Patent
Tindall (10) Patent No.: US 9,944,139 B2
(45) Date of Patent: Apr. 17, 2018

(54) INDIRECT MAGNETIC INTERLOCK

(75) Inventor: Leslie Tindall, Kent (GB)

(73) Assignee: ILLINOIS TOOL WORKS INC., Glenview, IL (US)

(*) Notice: Subject to any disclaimer, the term of this patent is extended or adjusted under 35 U.S.C. 154(b) by 1265 days.

(21) Appl. No.: 13/500,225

(22) PCT Filed: Sep. 24, 2010

(86) PCT No.: PCT/US2010/050192
§ 371 (c)(1),
(2), (4) Date: Apr. 4, 2012

(87) PCT Pub. No.: WO2011/043939
PCT Pub. Date: Apr. 14, 2011

(65) Prior Publication Data
US 2012/0205894 A1    Aug. 16, 2012

(30) Foreign Application Priority Data

Oct. 5, 2009    (GB) .................................... 0917392.3

(51) Int. Cl.
*B60D 1/54* (2006.01)
*B60D 1/155* (2006.01)

(52) U.S. Cl.
CPC .............. *B60D 1/54* (2013.01); *B60D 1/155* (2013.01); *Y10T 403/59* (2015.01); *Y10T 403/599* (2015.01)

(58) Field of Classification Search
USPC ..................................................... 280/491.3
See application file for complete search history.

(56) References Cited

U.S. PATENT DOCUMENTS

| 1,423,084 | A | 7/1922 | Cotton |
| 4,783,094 | A | 11/1988 | Sands |
| 6,273,449 | B1* | 8/2001 | Harkcom et al. .......... 280/491.3 |
| 6,460,870 | B2 | 10/2002 | Moss |
| 6,974,147 | B1 | 12/2005 | Kolda |
| 7,036,841 | B2 | 5/2006 | Champagne |
| 7,160,127 | B2* | 1/2007 | Brand .......................... 439/330 |

(Continued)

FOREIGN PATENT DOCUMENTS

| DE | 102007031336 A1 | 1/2009 |
| EP | 1084872 A2 | 3/2001 |

(Continued)

OTHER PUBLICATIONS

British Search Report for GB0917392.3 dated Jan. 19, 2010.
ISR for PCT/US2010/050192 dated Jan. 21, 2011.

*Primary Examiner* — Kevin Hurley
(74) *Attorney, Agent, or Firm* — Hauptman Ham, LLP (57) ABSTRACT

A latch arrangement for a tow bar is disclosed, the tow bar being attached to a vehicle via a hinge, and pivotable about an axis from a towing position to a stowed position, the latch mechanism comprises a primary latch for holding the tow bar in the stowed position and a secondary latch for holding the primary latch in the latched position. A tow bar arrangement for use with the latch arrangement and a mobile power unit to which the tow bar arrangement may be connected, are disclosed. Safety interlock arrangements for creating an interlock between the function of the latch arrangement and the function of the mobile power unit are described.

30 Claims, 12 Drawing Sheets

(56) References Cited

U.S. PATENT DOCUMENTS

| | | | |
|---|---|---|---|
| 7,549,243 B1* | 6/2009 | Gilles | 37/468 |
| 7,584,980 B2 | 9/2009 | Thompson | |
| 2002/0166707 A1* | 11/2002 | Palenchar et al. | 180/69.21 |
| 2005/0248125 A1 | 11/2005 | Flynn et al. | |
| 2009/0182471 A1* | 7/2009 | Bucher et al. | 701/50 |
| 2009/0322060 A1 | 12/2009 | MacDougall | |

FOREIGN PATENT DOCUMENTS

| | | |
|---|---|---|
| WO | 2004016456 A1 | 2/2004 |
| WO | 2008055342 A1 | 5/2008 |

* cited by examiner

SECTION X - X

SECTION Z - Z

INDIRECT MAGNETIC INTERLOCK

RELATED APPLICATIONS

The present application is national phase of PCT/US2010/050192 filed Sep. 24, 2010, and claims priority from British Application Number 0917392.3 filed Oct. 5, 2009.

The present invention relates to a latching device, more specifically a latching device for maintaining a hinged tow bar on a towable vehicle in a towing position.

A towable vehicle will often be provided with a tow bar which is attached to an end of the vehicle and which will be attached to the towing vehicle when the towable vehicle, referred to hereinafter as the trailer, is to be towed. To provide sufficient clearance between the two vehicles when towing, the tow bar on the trailer will have a certain length. For safety reasons and to prevent the tow bar providing an obstruction to vehicles passing nearby, or to reduce storage space, the tow bar may be pivotable about a hinge to a stowed position, so that it is stowed in a compact way.

A latching mechanism may be provided to maintain the tow bar in the stowed position in order that accidental disturbance or simple forces of gravity do not unexpectedly return the tow bar to the towing position unless this is desired.

The stowing of the tow bar in the stowed position may be related to further secondary functions. In a particular example, the tow bar may be a part of a mobile power unit which may be used for the provision of temporary or mobile power to a user. The power may be output to any temporary or permanent installation requiring power, such as a mobile exhibition unit, music stage or to a stationary transport vehicle such as a ship or an aeroplane. When the mobile power unit, also referred to as a ground power unit, is attached to the item receiving the power, it is desirable that the mobile power unit be immobilised in order that the output power cables are not accidentally detached by force if the mobile power unit is moved away from the stationary item to which it is delivering power.

Here, the particular example of an aviation ground power unit and a stationary aeroplane will be used to describe a particular scenario. In a known ground power unit, a system of interlocking is provided such that power will only be output from the unit when the tow bar is in the stowed position. Moving the tow bar to the stowed position will also apply brakes to the wheels of the ground power unit in order that it cannot be accidentally moved. Further, a large electromagnet is provided to maintain the tow bar in the stowed position while the ground power unit is connected to the aeroplane. If the ground power unit is towed away while the cables are still connected to the aeroplane, then damage can be caused to both the aeroplane and ground power unit, resulting in significant cost to the ground handling company and to the airline. By ensuring that the tow bar is only released when the output power cables are disconnected from the aeroplane, a situation in which both the aeroplane and the ground power unit could be damaged can be avoided. A potential draw back of the known ground power unit is that the force of the electromagnet holding the tow bar in the stowed position may be overcome and thus the ground power unit may still be accidentally towed away while the power cables are connected to the aircraft. A further drawback is that power may be withdrawn from the aircraft unexpectedly at an inconvenient or even critical moment. Accordingly, there exists a need for an improved latch system for maintaining a tow bar in a stowed position.

According to the present invention there is provided a latch arrangement for a tow bar, the tow bar being attached to a vehicle via a hinge, and pivotable about an axis from a towing position to a stowed position, the latch arrangement comprising:

a primary latch for holding the tow bar in the stowed position;

a secondary latch for holding the primary latch in the latched position.

The provision of both a primary latch and a secondary latch for holding the tow bar in the stowed position means that it is necessary to release more than one latch in order to release the tow bar from the stowed position and move it to the towing position. Further, it is possible to provide a primary latch which is of greater strength and can thus more effectively maintain the tow bar in the stowed position, while a less substantial, secondary latch can be used as a safety mechanism to maintain the primary latch in the latched position.

The primary latch may comprise a mechanical latch. The use of a mechanical latch as opposed to an alternative latching means, such as an electromagnet, can provide a latching arrangement which is resistant to greater forces and thus maintains the tow bar in the stowed position more effectively.

The secondary latch may comprise an electromagnetic latch. The use of an electromagnetic latch as the secondary rather than the primary latch means that a lesser electromagnetic force is required to hold the primary latch in the closed position, as compared to the force required to hold the tow bar in the stowed position. This means that a lower powered electromagnet may be used, resulting in a saving in power consumption and component cost.

The primary latch may comprise a latching portion and a lever portion which are movable relative to one another. Providing a lever portion movable relative to the latching portion allows the latching portion to either move in unison with the lever portion to release the latch or, if so desired, the lever portion may be allowed to move independently of the latching portion such that the primary latch is not released when the lever portion is moved.

The motion applied to the lever portion may be transferred to the latching portion by a biasing means. This allows the force transferred from the lever portion to the latching portion to be limited by the force required to form the biasing means. In this way, it is possible to prevent any force applied to the lever portion from overcoming a holding force provided by the secondary latch, in order to maintain the latching portion of the primary latch in a closed position.

The force required to open the secondary latch may be greater than the force required to deform the biasing means, such that operation of the lever when the secondary latch is engaged deforms the biasing means and the primary and secondary latches remain engaged. This arrangement prevents the disengagement of the secondary latch, and thus the primary latch, by use of an excessive force applied to the lever portion.

The lever portion and the latch portion may be pivotable around an axis relative to one another. In an arrangement where the primary latch is pivotable around an axis to move it from a latching position to a release position, providing a lever portion pivotable relative to the latch portion allows the transfer of a moment applied to the lever portion to the latch portion via the biasing means.

There may further be provided a tow bar arrangement for a vehicle, comprising:

a tow bar for attachment to a main body of the vehicle via hinge; and a latch arrangement according to the present invention.

The tow bar arrangement may further comprise a first interlock to activate the secondary latch when a first condition is satisfied. This allows the activation or release of the secondary latch to be dependent upon a condition relating to the vehicle to which the tow bar arrangement is attached, or relating to some condition relating to the operation of the vehicle or any other condition.

The tow bar arrangement may be attached to a mobile power unit having output power cables wherein the first condition is satisfied when the output power cables are stowed in the mobile power unit. Ensuring that the output power cables of the mobile power unit are stowed in the mobile power unit before the secondary latch is released, and the first latch and the tow bar are correspondingly released, prevents the mobile power unit from being towed away with the power cables attached to the receiver of the output power.

A second interlock may be provided to prevent the output of power from the mobile power unit when the tow bar is not in the stowed position. This interlock creates the requirement that the tow bar be moved to the stowed position before power is output, with the result that the first and second latches are engaged prior to the provision of power from the power unit to the unit receiving the power.

The second interlock may comprise a proximity sensor, or electrical contacts such as a limit switch or any other type of position sensing transducer.

A brake interlock may be provided to apply a brake to the wheels of the vehicle when the tow bar is in the stowed position. This prevents the unit from being moved by shunting or other means when the tow bar is in the stowed position.

A mobile power unit may be provided having a tow bar arrangement provided with a latch arrangement according to the present invention.

The invention will now be described in detail with reference to the flowing figures in which.

Figure 1:
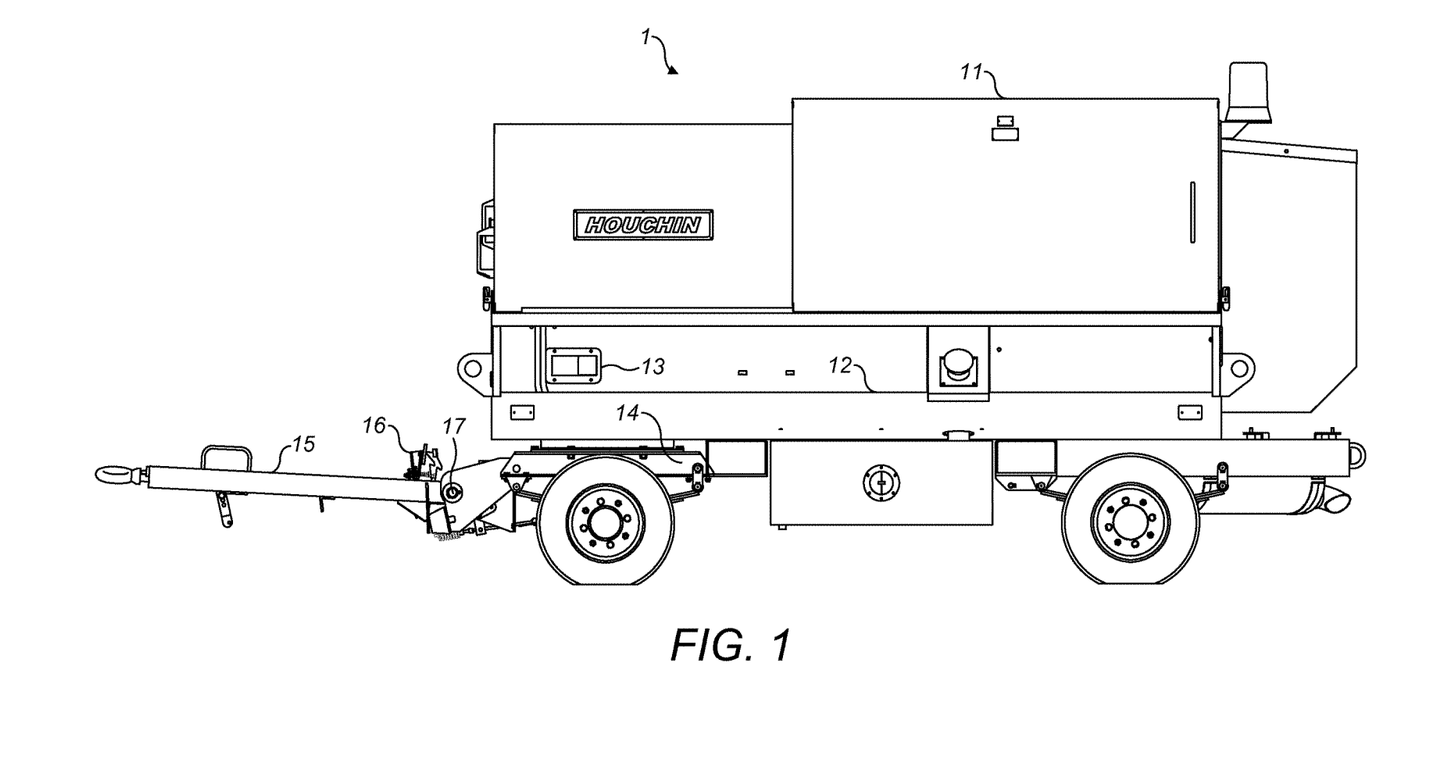
FIG. 1 shows an example of a mobile power unit to which the latch arrangement of the present invention may be provided.

In FIG. 1 a mobile power unit is shown having a main body 11 in which power generation means may be provided. A cable tray 12 is also provided, in which output cable(s) (not shown) may be stowed when not in use. A cable socket holster 13 is also provided, into which the socket(s) of the output cable(s) may be stowed when not in use. A turntable assembly 14 is provided and a pivotable tow bar 15 is attached to the turntable assembly for towing the mobile power unit. A latch arrangement 16 according to the present invention is shown in an unlatched position, allowing the tow bar to have been lowered into the towing position shown.

Figure 2:
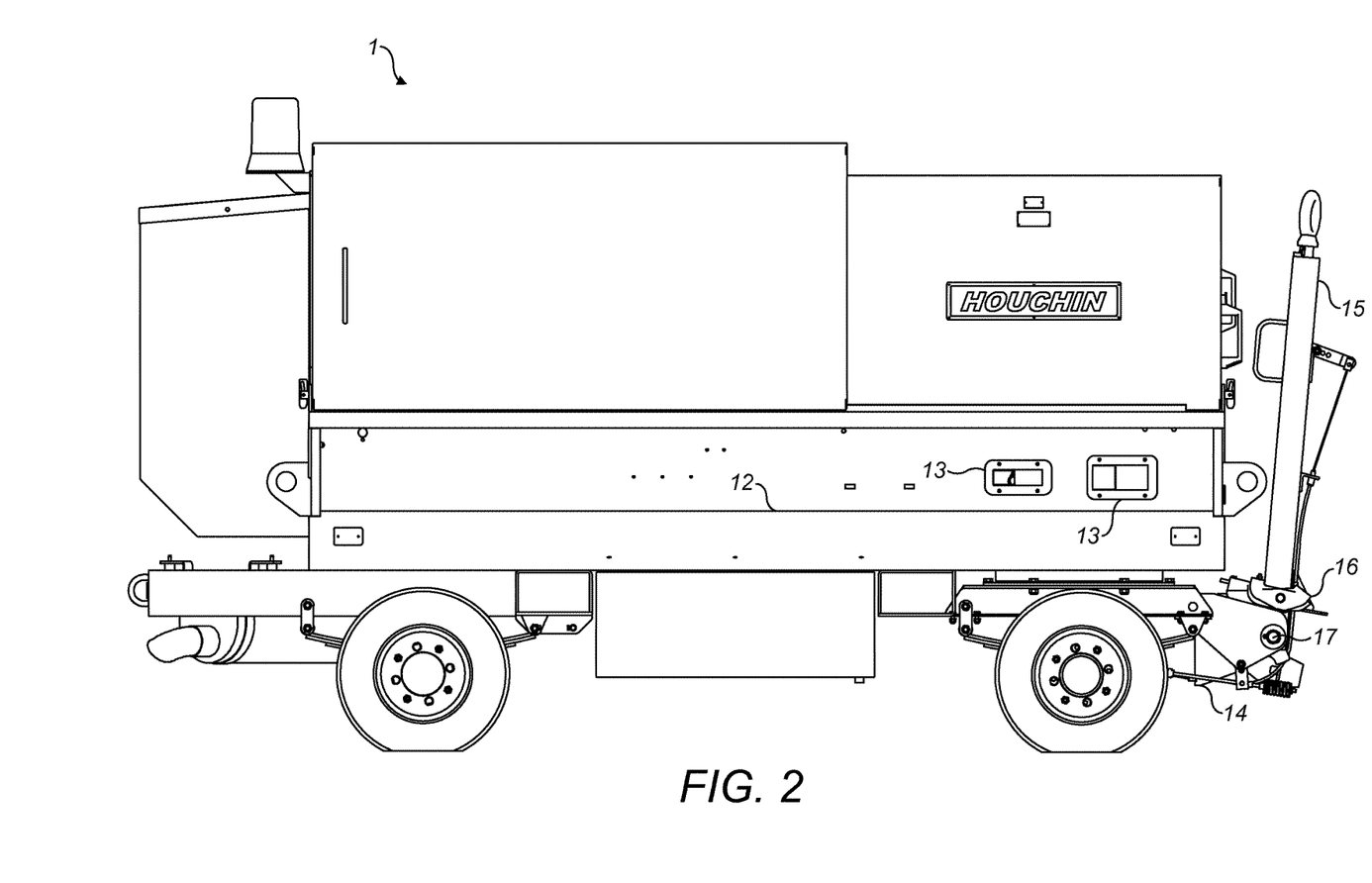
FIG. 2 shows the mobile power unit of FIG. 1 with the tow bar in a stowed position.

FIG. 2 shows the same mobile power unit as is shown in FIG. 1, viewed from the opposite side. An equivalent cable storage tray 12 is shown, along with further cable socket holsters 13 for receiving the ends of the output cable(s) (not shown) when the output cables are not in use for delivering power. Turntable assembly 14 is seen, viewed from the opposite side to that shown in FIG. 1. Tow bar 15 is shown in the stowed position and a latch arrangement 16 according to the present invention is shown holding the tow bar in the upright position. In FIGS. 1 and 2 the tow bar is pivotable about hinge 17.

Figures 3, 4:
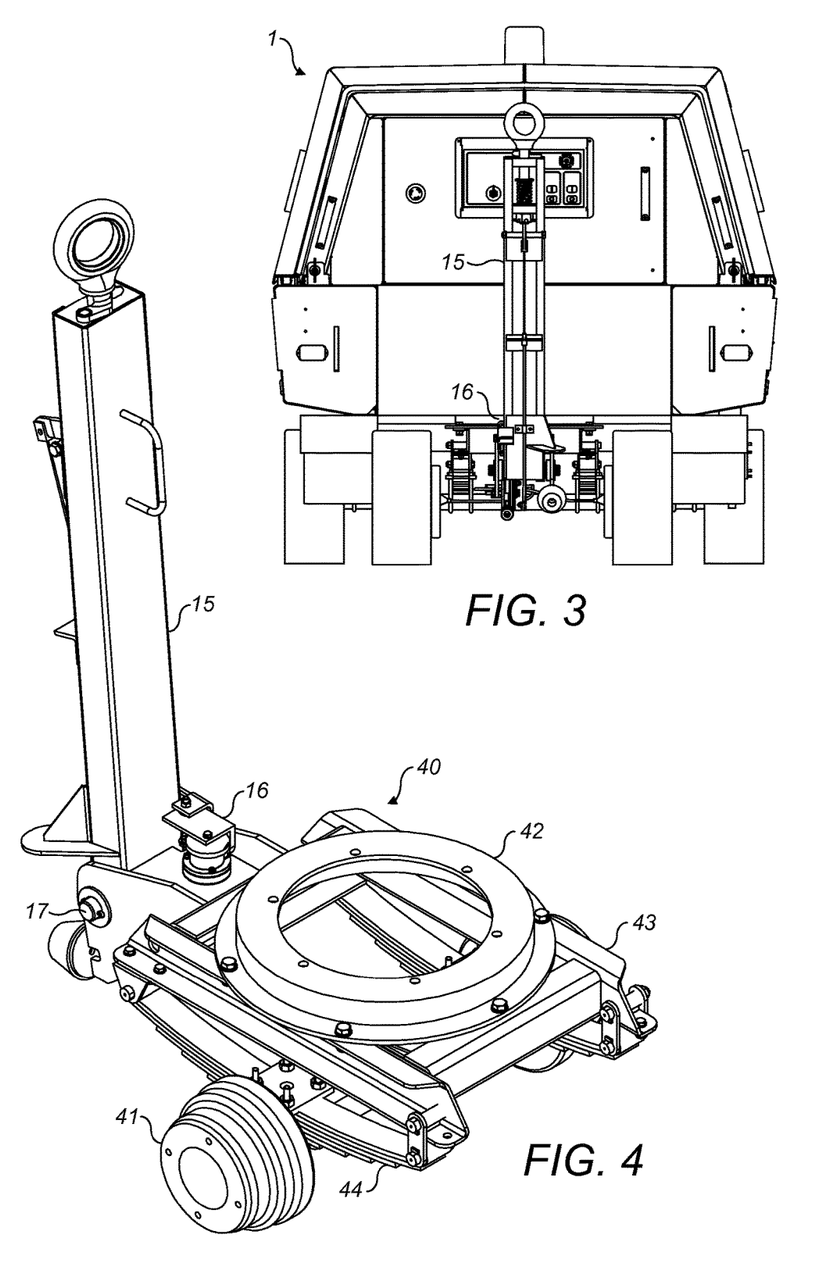
FIG. 3 shows a front view of the mobile power unit of FIG. 2.
FIG. 4 shows a turntable sub-assembly to which a tow bar and the latch arrangement of the present invention may be provided.

FIG. 3 shows a mobile power unit as shown in FIGS. 1 and 2, viewed from the front, towing end. Tow bar 15 is shown in the stowed position and the latch arrangement 16 according to the present invention is shown maintaining the tow bar in the upright position.

FIG. 4 shows a turntable sub-assembly suitable for mounting on the mobile power unit shown in FIGS. 1 to 3, or indeed upon any towable vehicle. Wheels may be mounted on hubs 41 and loads transmitted through turntable 42 to chassis 43, through springs 44 and subsequently through the hubs and wheels (not shown) to the ground. Tow bar 15 is shown, pivoted around hinge 17, in the stowed position. A latch arrangement 16 according to the present invention is shown maintaining the tow bar 15 in the stowed position.

Figure 5A:
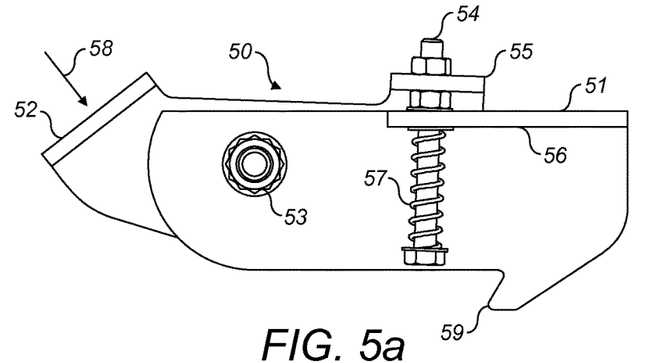
FIG. 5 shows a sub-assembly of a latch mechanism.

FIG. 5 shows a detailed sub-assembly illustration of how a primary latch 51 and a corresponding lever section 52 may be arranged. Primary latch 51 and lever 52 are both pivotable about a pivot 53. A bolt 54 is attached to an attachment portion 55 of lever 52 and passes freely through a gap in attachment portion 56 of primary latch 51. A spring 57 is provided to transfer forces from attachment portion 55 of lever 52 to attachment portion 56 of primary latch 51 via bolt 54. When a force is provided to lever 52 in the direction of arrow 58, a moment is created in the anti-clockwise direction around pivot 53. A resultant tension is created in bolt 54, which results in a compressive force upon spring 57, which in turn results in a lifting force upon attachment section 56 of primary latch 51. A hook 59 is provided on primary latch 51 to engage with a corresponding part attached to the vehicle to which the latch arrangement is provided.

Figure 5B:
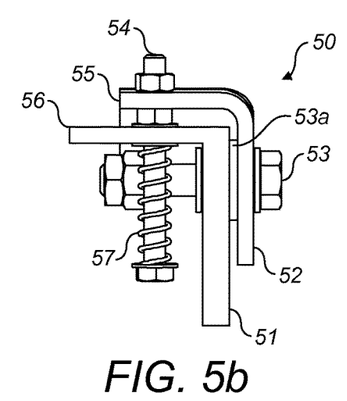

FIG. 5b shows an end view of primary latch 51 corresponding to the side view shown in FIG. 5a. Bush 53a is shown, which provides a separation between parts 51 and 52 in order to allow them to pivot more easily around bolt 53.

Figure 6:
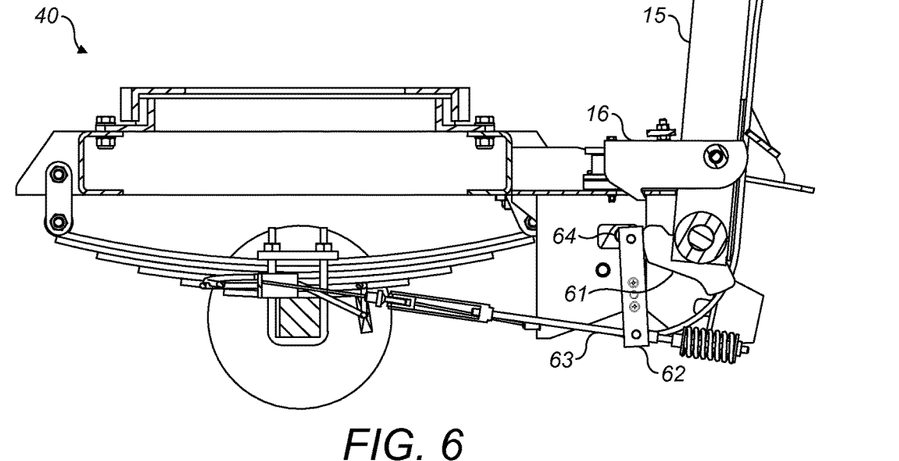
FIG. 6 shows a section through the sub-assembly of FIG. 4 with the tow bar in the stowed position.

FIG. 6 shows turntable sub-assembly 40 with tow bar 15 in the stowed position and held in place by latch arrangement 16. With the tow bar in the stowed position tow bar cam 61 moves rocker arm 62 to apply tension to park brake actuator rod 63. This ensures that the parking brake is applied on the wheels of the turntable assembly while the tow bar 15 is in the stowed position. Proximity sensor 64 detects when the tow bar is in the upright position. The output of this proximity sensor may be used to provide an interlock, which prevents output of power from a mobile power unit to which the illustrated turntable assembly is connected when the tow bar is not in the stowed position.

Figure 7:
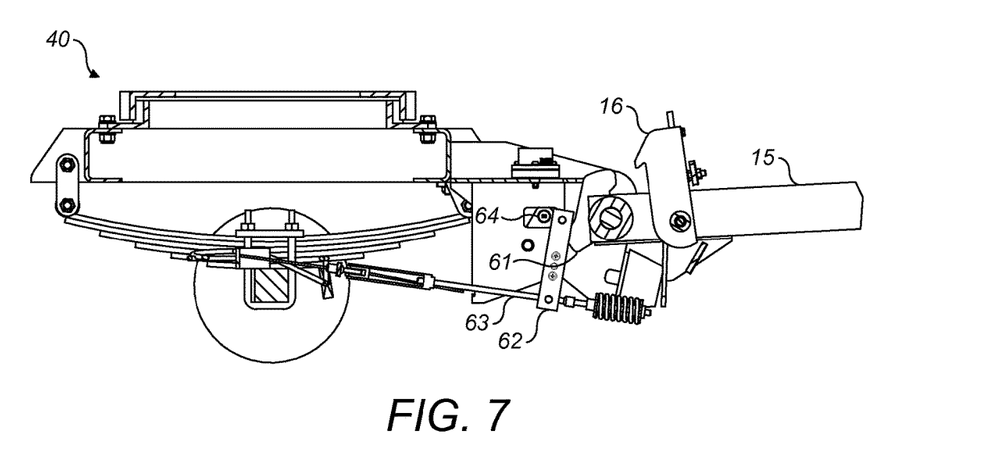
FIG. 7 shows the sub-assembly of FIG. 6 with the tow bar in the towing position.

FIG. 7 illustrates the turntable assembly of FIG. 6 with the tow bar in the towing position. Latch arrangement 16 has been released to allow the tow bar to move to the towing position. Tow bar cam 61 has thus also moved and rocker arm 62 has followed the cam to release the tension applied to park brake actuator rod 63. This releases the parking brake from the wheels (not shown) of turntable sub-assembly 40. Rocker arm 62 has also moved away from proximity sensor 64 to allow detection of the fact that the brake has been released and the tow bar is in the towing position. An output from this proximity sensor may be used to disable and enable the output of power from a mobile power unit to which turntable assembly 40 is mounted.

Figure 8A:
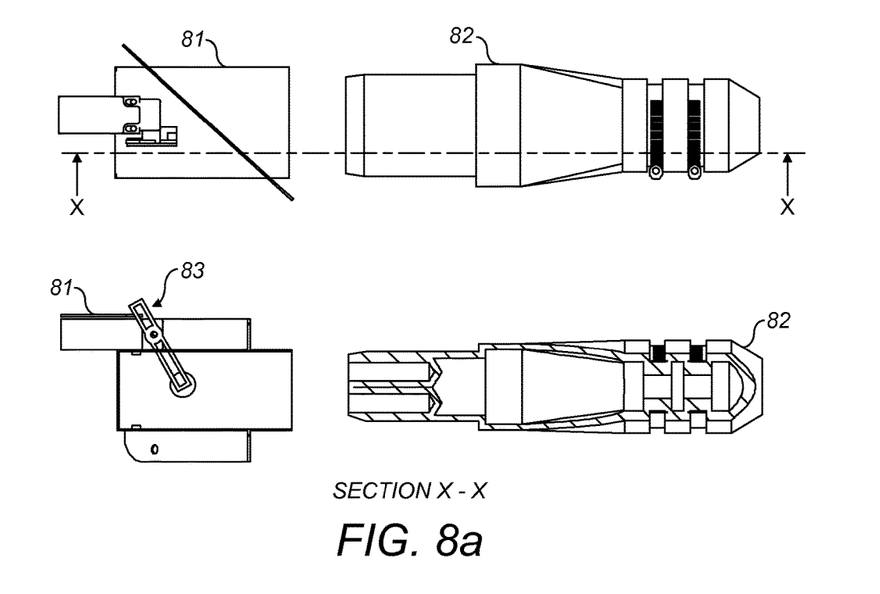
FIGS. 8a to 8c illustrate the latch arrangement of the present invention holding a tow bar in a stowed position.
Figure 8B:
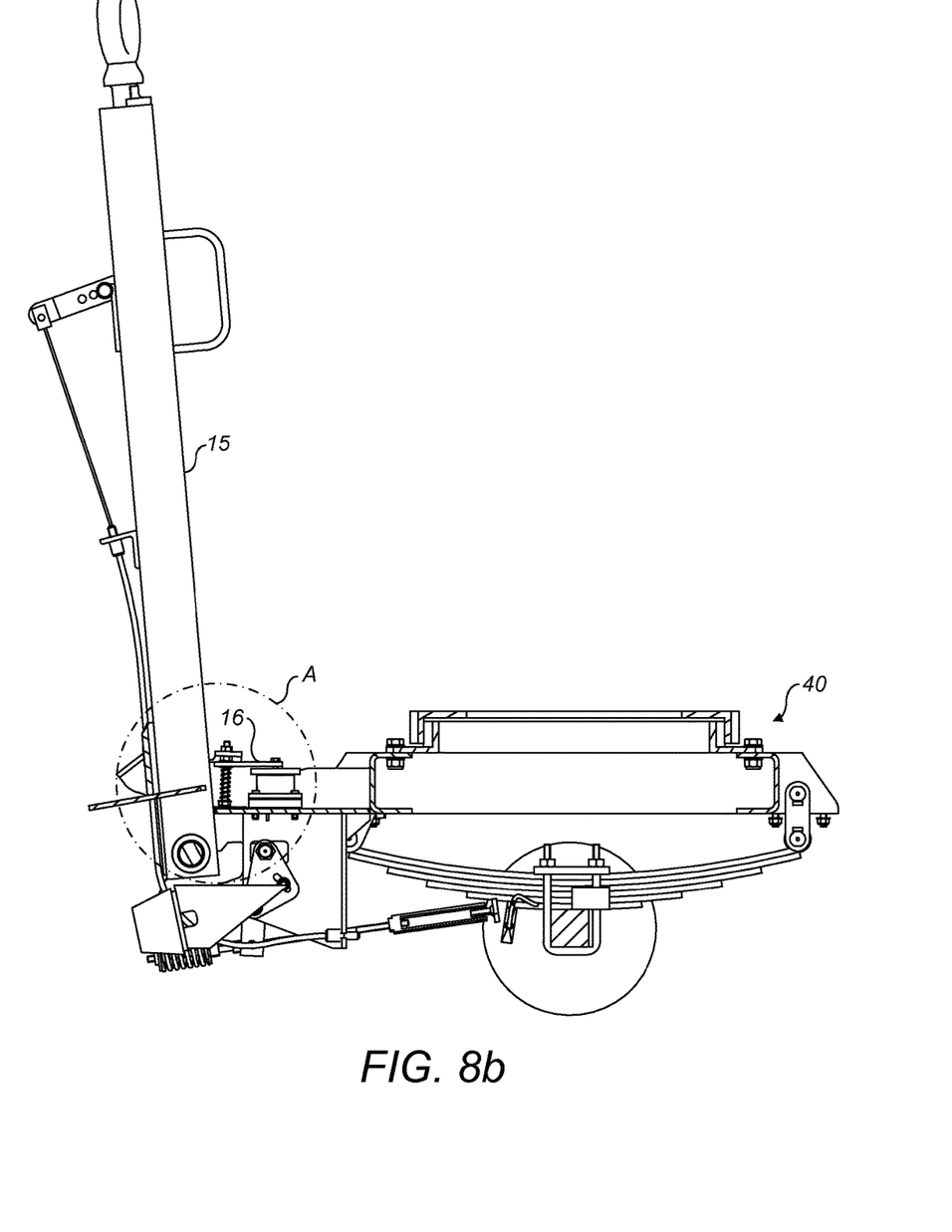
Figure 8C:
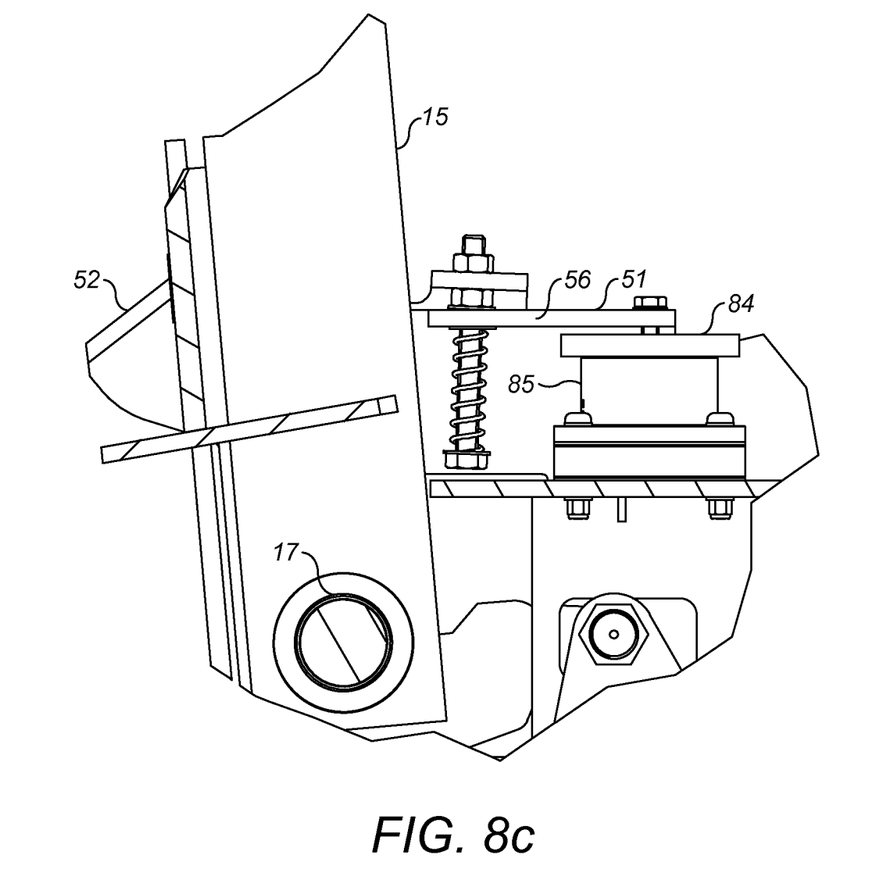
Figure 9A:
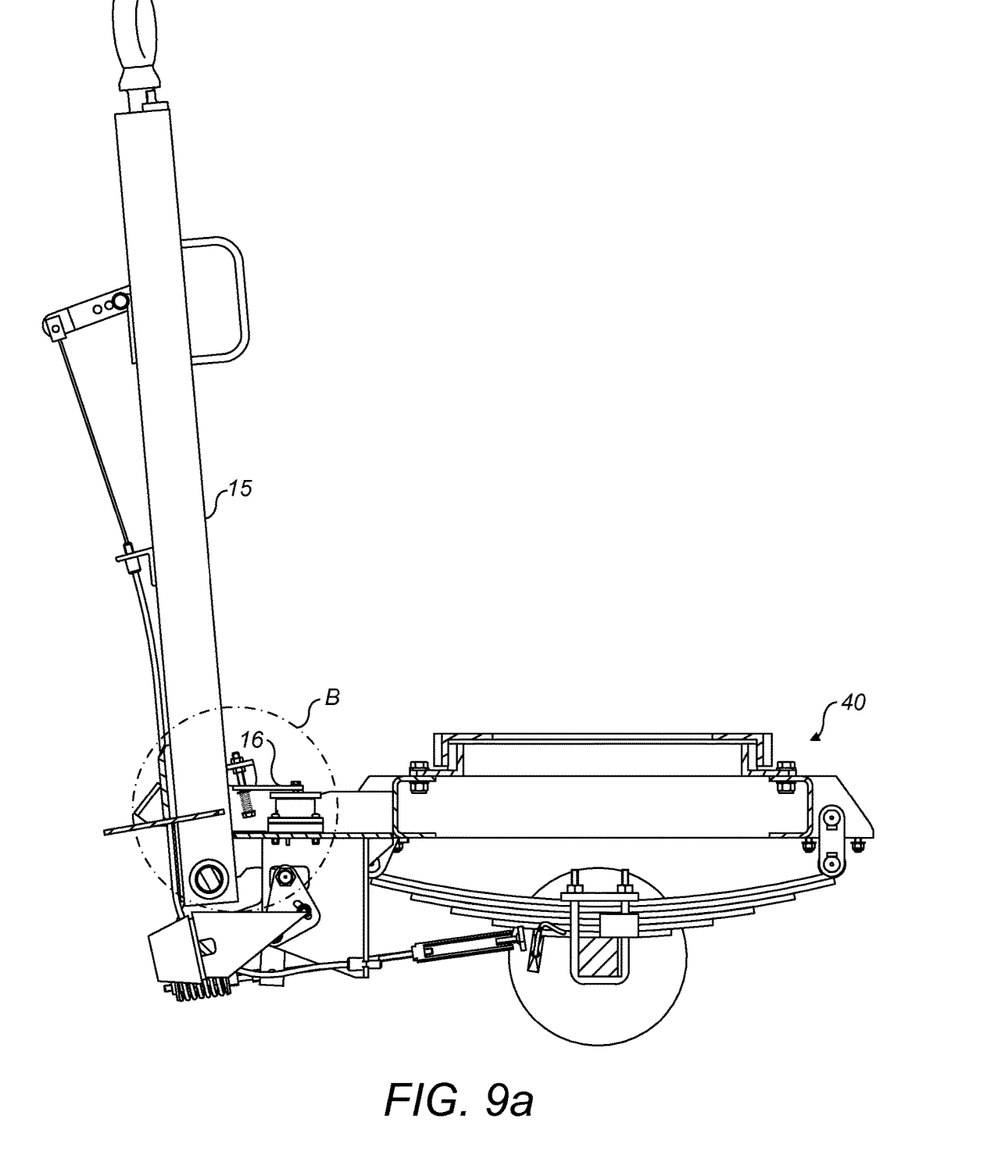
FIGS. 9a and 9b show the operation of a latch mechanism with a separately moveable lever arrangement.
Figure 9B:
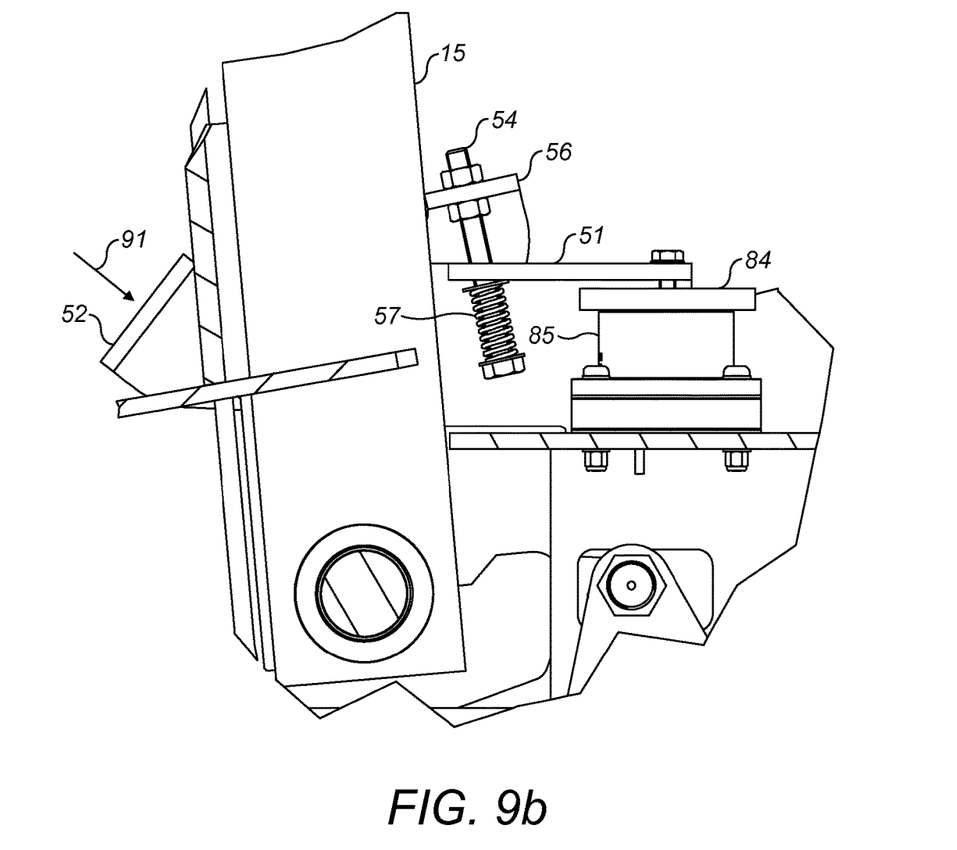
Figures 10A, 10B:
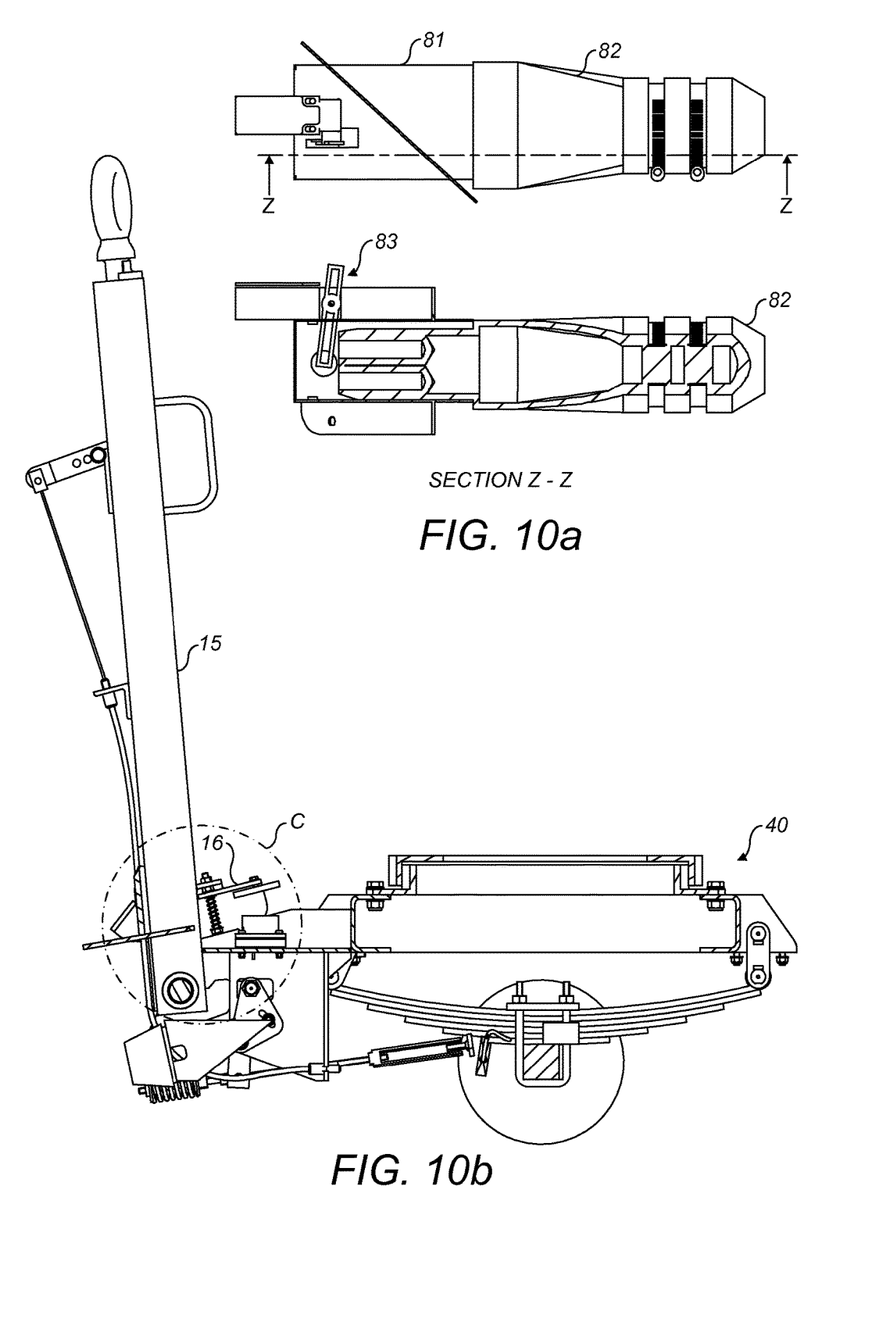
FIGS. 10a to 10c show a latch arrangement according to the present invention in a released position.
Figure 10C:
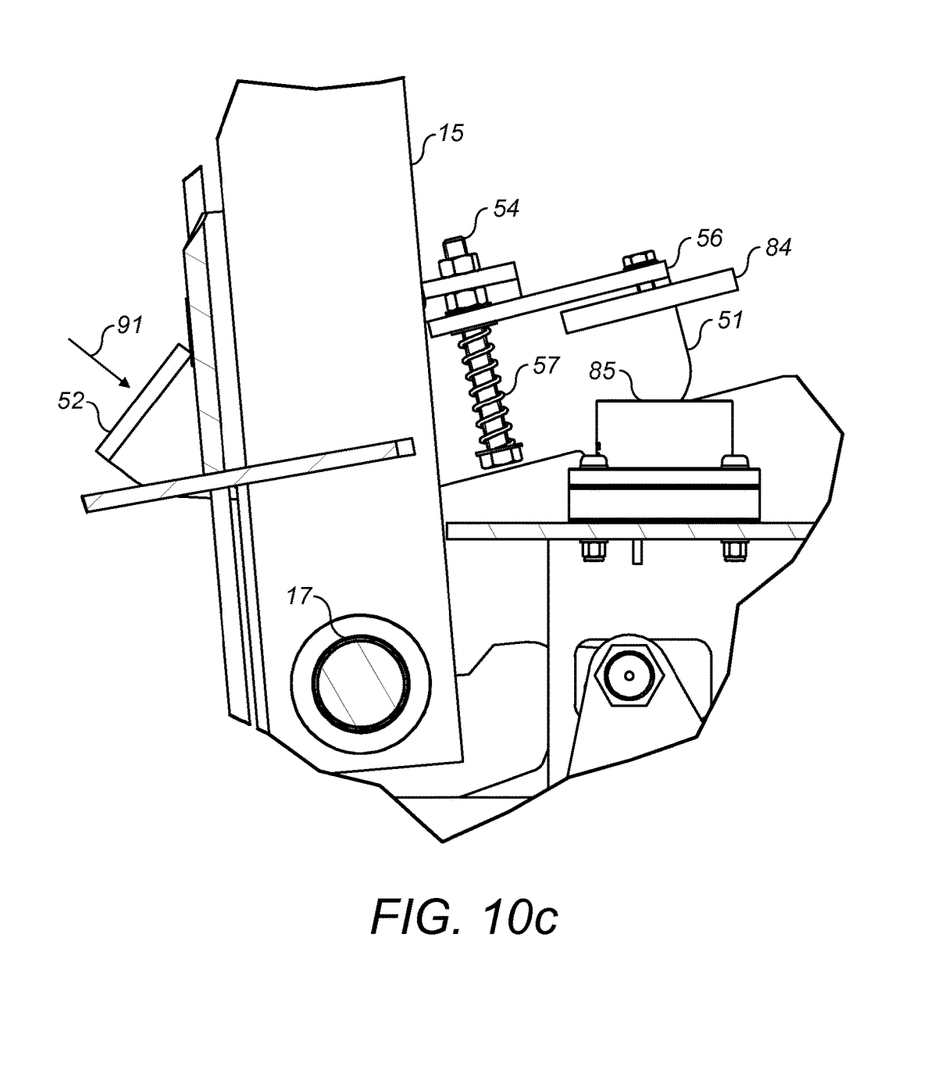

FIGS. 8 to 10 show different scenarios under which a latching arrangement according to the present invention may be operated.

FIG. 8a shows an example of a holster 81 for output power cable plugs 82 which may be mounted to output power cables of a mobile power unit 1 to which turntable assembly 40 may be mounted. Switch 83 is provided to detect the presence of plug 82 in socket 81.

FIG. 8b shows the turntable assembly 40 with the tow bar 15 in the stowed position. Latch arrangement 16 is shown holding the tow bar in the stowed position. An enlargement of circle A of FIG. 8b is shown in FIG. 8c. Primary latch 51 is in the latched position, holding tow bar 15 in the stowed position. Armature plate 84 is attached to attachment section 56 of primary latch 51. Electromagnet 85 is provided to perform the function of a secondary latch. When electromagnet 85 is energised, an attracting force between armature plate 84 and electromagnet 85 is created, which holds primary latch 51 in the latched position. Therefore, while electromagnet 85 is energised, primary latch 51 cannot be released without overcoming the attractive force created by the electromagnets and armature plate 84.

FIGS. 9a and 9b illustrate a second scenario in which cable plug 82 is removed from holster 81, as illustrated in FIG. 8a. The output of switch 83 detecting the non-presence of the plug in the holster 81 can be used to energise electromagnet 85 to create an attractive force to armature plate 84. In FIG. 9b, which is an enlargement of circle B in FIG. 9a, a force is applied to lever 52 in the direction of arrow 91. Lever 52 has thus rotated around bolt 53, which cannot be seen in FIG. 9b, since it is behind tow bar 15. However, the force created by electromagnet 85 attracting armature plate 84 is sufficient to compress spring 57 and thus primary latch 51 does not move with lever 52 and the primary latch remains in the latched position, maintaining the tow bar in the stowed position.

FIG. 10a illustrates a power output cable plug mounted in a holster 81 and thus activating switch 83. On a trailer unit, the output of the switch may be used to switch off electromagnet 85 to release the latch arrangement of the present invention.

FIGS. 10b and 10c illustrate the latching arrangement being released when electromagnet 85 is de-energised. FIG. 10c shows an enlargement of the circle C shown in FIG. 10b. In this case, a force has been applied to lever 52 in the direction of arrow 91 in the same way as illustrated in FIG. 9b. Again, lever 52 has rotated around pivot 53, which is not visible in FIG. 10c, since it is behind tow bar 15. The rotational motion is transmitted through bolt 54 to apply a compressive force to spring 57. Since there is no longer an attractive force between electromagnet 85 and armature plate 84 to counteract the force applied to attachment portion 56 of primary latch 51, the force acts to lift the latch mechanism and armature plate 84 away from electromagnet 85 and the tow bar 15 is therefore released and may be pivoted to the towing position.

Figure 11:
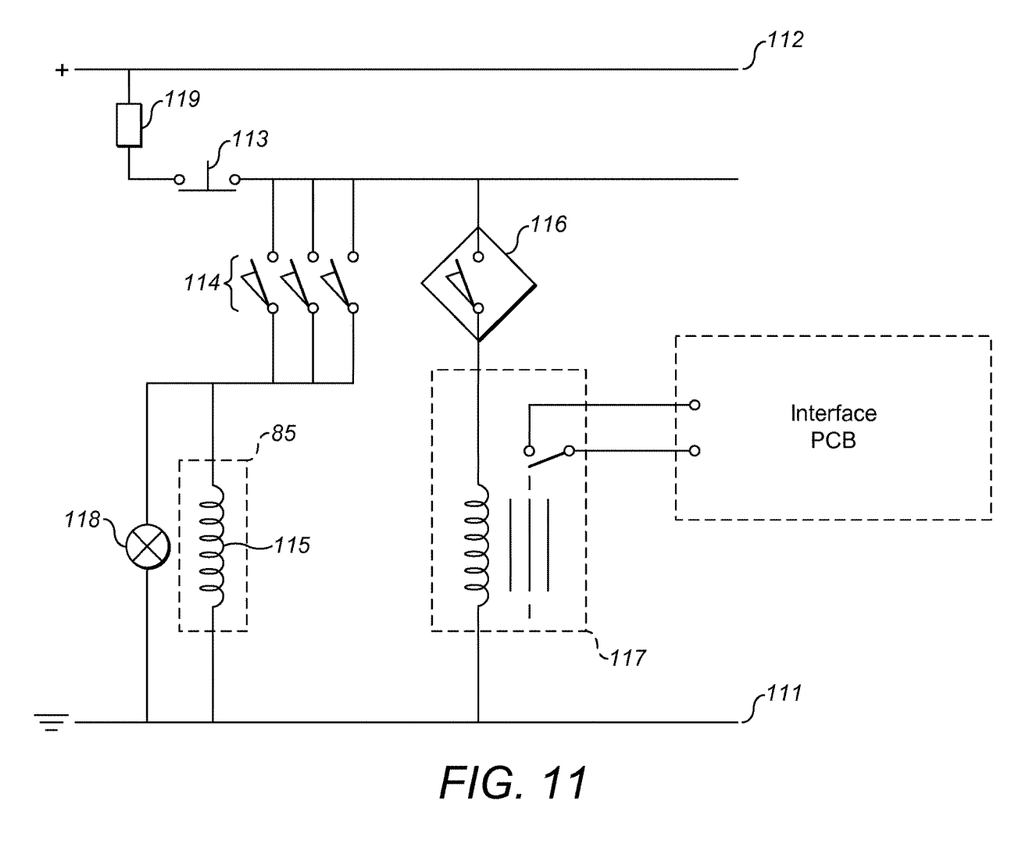
FIG. 11 shows a control diagram for an interlock system for use with the present invention.

FIG. 11 shows an example of a control circuit which may be used in conjunction with the mobile power unit, tow bar arrangement and latch arrangement described herein. The control circuit is connected to panel earth 111 and voltage supply 112. An emergency stop switch contact 113 may be provided to cut power to the control circuit.

A plurality of output power cable socket detector switches 114 may be provided, connected in parallel with one another, between the output of the emergency stop switch and the coil 115 of electromagnet 85. The removal of any of the output cables from holsters 13 will result in the closure of the corresponding switch 114 and the electromagnet 115 will be energised.

Proximity switch 116 is further connected to timer relay 117, which introduces a delay after the tow bar has been raised and the proximity switch activated. Switches 114 and proximity sensor 116 may be replaced by any suitable detection means, such as an electrical contact, limit switch or any other position-sensing transducer. The timer relay 117 is used to provide a zero volts input to the main interface PCB to disable main output contactors when the tow bar is not in the stowed position. A 1 second delay may be provided to protect the circuit against mechanical bounce that may cause the proximity switch to double trip as the tow bar is being stowed.

The indicator lamp 118 is provided so that the operator can see when the magnet is energised. Fuse 119 is provided to protect the circuit from overload.

Although the preceding description describes one embodiment of the invention with reference to specific examples, it will be appreciated that the latch arrangement of the present invention may be applied to any tow bar arrangement which is movable from a towing position to a stowed position and various physical embodiments not described in detail herein may fall within the scope of the claims.

The invention claimed is:

1. A latch arrangement for a tow bar, the tow bar being attached to a vehicle via a hinge, and pivotable about an axis from a towing position to a stowed position, the latch arrangement comprising:
   a primary latch for holding the tow bar in the stowed position;
   a secondary latch for holding the primary latch in the latched position.

2. A latch arrangement according to claim 1, wherein the primary latch comprises a mechanical latch.

3. A latch arrangement according to claim 1, wherein the secondary latch comprises an electromagnetic latch.

4. A latch arrangement according to claim 2, wherein the primary latch comprises a latching portion and a lever portion which are movable relative to one another.

5. A latch arrangement according to claim 4, wherein motion applied to the lever portion is transferred to the latching portion via a biasing means.

6. A latch arrangement according to claim 5, wherein the force required to open the secondary latch is greater than the force required to deform the biasing means, such that operation of the lever portion when the secondary latch is engaged deforms the biasing means and the primary and secondary latches remain engaged.

7. A latch arrangement according to claim 4, wherein the lever portion and the latch portion are pivotable around an axis relative to one another.

8. A tow bar arrangement for a vehicle, comprising:
a tow bar for attachment to a main body of the vehicle via a hinge; and
a latch arrangement according to claim 1.

9. A tow bar arrangement according to claim 8, further comprising a first interlock to activate the secondary latch when a first condition is satisfied.

10. A tow bar arrangement according to claim 9, wherein the tow bar arrangement is attached to a mobile power unit having output power cables and wherein the first condition is satisfied when the output power cables are stowed in the mobile power unit.

11. A tow bar arrangement according to claim 10, further comprising a second interlock to prevent the output of power from the mobile power unit when the tow bar is not in the stowed position.

12. A tow bar arrangement according to claim 11, wherein the second interlock comprises a proximity sensor, or a limit switch or other sensing transducer.

13. A tow bar arrangement according to claim 8, further comprising a brake interlock to apply a brake to the wheels of the vehicle when the tow bar is in the stowed position.

14. A mobile power unit, having a tow bar arrangement according to claim 8.

15. A device, comprising:
a latch arrangement comprising a primary latch configured to hold a tow bar in a stowed position as opposed to a towing position and a secondary latch configured to hold the primary latch in the latched position.

16. The device according to claim 15, wherein the primary latch comprises a mechanical latch.

17. The device according to claim 15, wherein the secondary latch comprises an electromagnetic latch.

18. The device according to claim 16, wherein the primary latch comprises a latching portion and a lever portion which are movable relative to one another.

19. The device according to claim 18, wherein the device is configured such that motion applied to the lever portion is transferred to the latching portion via a biasing means.

20. The device according to claim 19, wherein the device is configured such that a force required to open the secondary latch is greater than the force required to deform the biasing means, such that operation of the lever portion when the secondary latch is engaged deforms the biasing means and the primary and secondary latches remain engaged.

21. The device according to claim 18, wherein the lever portion and the latch portion are pivotable around an axis relative to one another.

22. A tow bar arrangement for a vehicle, comprising:
a tow bar configured to pivot about an axis from a towing position to a stowed position and configure to attach to a main body of a vehicle via a hinge; and
the device of claim 15.

23. The tow bar arrangement according to claim 22, further comprising a first interlock configured to activate the secondary latch when a first condition is satisfied.

24. An apparatus, comprising:
a mobile power unit; and
the tow bar arrangement of claim 22 attached to the mobile power unit, wherein the mobile power unit has output power cables and wherein the first condition is satisfied when the output power cables are stowed in the mobile power unit.

25. The apparatus of claim 24, further comprising a second interlock configured to prevent the output of power from the mobile power unit when the tow bar is not in the stowed position.

26. The apparatus according to claim 25, wherein the second interlock comprises a proximity sensor, or a limit switch or other sensing transducer.

27. A tow bar arrangement according to claim 22, further comprising a brake interlock to apply a brake to the wheels of the vehicle when the tow bar is in the stowed position.

28. A mobile power unit, including:
the tow bar arrangement according to claim 22.

29. A latch arrangement according to claim 1, wherein the latch arrangement includes a structural portion proximate the primary latch configured such that the secondary latch applies a force to the primary latch via the structural portion proximate the primary latch when the secondary latch is activated to hold the primary latch in the latched position.

30. The device of claim 15, wherein the device includes a structural portion proximate the primary latch configured such that the secondary latch applies a force to the primary latch via the structural portion proximate the primary latch when the secondary latch is activated to hold the primary latch in the latched position.

* * * * *